United States Patent
Inaba

(10) Patent No.: US 10,179,409 B2
(45) Date of Patent: Jan. 15, 2019

(54) ROBOT SYSTEM HAVING COOPERATIVE OPERATING REGION

(71) Applicant: FANUC CORPORATION, Yamanashi (JP)

(72) Inventor: Gou Inaba, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/802,529

(22) Filed: Nov. 3, 2017

(65) Prior Publication Data

US 2018/0126562 A1 May 10, 2018

(30) Foreign Application Priority Data

Nov. 10, 2016 (JP) ................................. 2016-219767

(51) Int. Cl.
*B25J 9/16* (2006.01)
*G05B 19/418* (2006.01)
(Continued)

(52) U.S. Cl.
CPC .......... *B25J 13/089* (2013.01); *B25J 9/1602* (2013.01); *B25J 9/1664* (2013.01); *B25J 9/1676* (2013.01); *B25J 9/1694* (2013.01); *B25J 13/085* (2013.01); *G05B 19/4103* (2013.01); *G05B 19/41815* (2013.01)

(58) Field of Classification Search
CPC ...... B25J 9/1666; B25J 9/1676; B25J 9/1674; B25J 9/1664; B25J 19/06; G05B 19/4061; G05B 2219/39082; G05B 2219/40201; G05B 2219/40202; G05B 2219/40203; G05B 2219/49143; G05B 2219/49153; G05B 2219/40198; G05B 2219/40559; G05B 2219/36468; G05B 2219/40224; G05B 2219/49147; G05B 2219/40497; G05B 2219/40476; G05B 2219/49137; G05B 2219/40213; G05B 2219/50198; G05B 2219/39219; G05B 2219/49141; G05B 2219/43202; G05B 2219/49138; G05B 19/0428; G05B 2219/40339; G05B 19/406; G05B 2219/40317; G05B 2219/49157; G05D 1/0214
See application file for complete search history.

(56) References Cited

U.S. PATENT DOCUMENTS

2016/0176052 A1 6/2016 Yamamoto
2017/0357242 A1* 12/2017 Watanabe ................ B25J 19/06

FOREIGN PATENT DOCUMENTS

CN 101239467 A 8/2008
CN 105798907 A 7/2016
(Continued)

*Primary Examiner* — Dale Moyer
(74) *Attorney, Agent, or Firm* — Hauptman Ham, LLP

(57) ABSTRACT

A control device of a robot system includes a position recording section that records a stopping position of a robot when the robot has been stopped by a stopping section, and a position distribution generation section that generates a distribution of the stopping positions of the robot recorded by the position recording section. The control device further includes a speed changing section that automatically changes an operating speed of the robot in accordance with the generated stopping position distribution of the robot.

6 Claims, 5 Drawing Sheets

(51) Int. Cl.
*B25J 13/08* (2006.01)
*G05B 19/4103* (2006.01)

(56) References Cited

FOREIGN PATENT DOCUMENTS

| | | |
|---|---|---|
| JP | 8-305429 A | 11/1996 |
| JP | 2007-283450 A | 11/2007 |
| JP | 2012-56026 A | 3/2012 |
| JP | 5927284 B1 | 6/2016 |
| JP | 2016-159407 A | 9/2016 |
| WO | 2016/103308 A1 | 6/2016 |

\* cited by examiner

ROBOT SYSTEM HAVING COOPERATIVE OPERATING REGION

RELATED APPLICATIONS

The present application claims priority to Japanese Patent Application Number 2016-219767 filed Nov. 10, 2016, the disclosure of which is hereby incorporated by reference herein in its entirety.

BACKGROUND OF THE INVENTION

1. Field of the Invention

The present invention relates to a robot system having a cooperative operating region where a worker and a robot can enter simultaneously.

2. Description of the Related Art

Recently, cooperative robot systems are being developed in which workers and robots are dispatched together on a factory floor, and manufacturing tasks are shared by the workers and robots. A safety fence is sometimes installed between a worker and a robot to ensure the worker's safety. However, installing a safety fence also slows work down, and thus cooperative robot systems that do not use safety fences have been proposed.

According to JP-B-5927284, when a robot comes near or makes contact with a worker, the robot is stopped in accordance with a detected external force to ensure the worker's safety. In this regard, according to JP-A-2007-283450, the operating speed of a robot is limited in the case where a worker or the robot enters a predetermined region. Thus, according to JP-B-5927284 and JP-A-2007-283450, the worker's safety can be ensured.

SUMMARY OF THE INVENTION

However, in the case where the robot is stopped as in JP-B-5927284, etc., action must be taken to resume the robot operation. Thus, to increase the efficiency of the work carried out by the robot, it is desirable to avoid stopping the robot to the greatest extent possible.

In this regard, in the case where there is unintentional contact between the robot and the worker, there is a high possibility that the worker will make an error in his or her work. Thus, if the robot and the worker come into contact frequently, the work efficiency and safety will decrease. Furthermore, according to JP-A-2007-283450, an operator must clearly define the predetermined region in advance using a safety sensor, etc. Such advance tasks are complicated and time-consuming.

The present invention has been made in view of such circumstances and has an object to provide a cooperative robot system capable of improving work efficiency and the safety of a worker without requiring tasks to be carried out in advance.

To achieve the above-described object, a first aspect of the invention provides a robot system having a cooperative operating region where a worker and a robot can enter simultaneously. The system includes a control device controlling the robot. The control device includes: a stopping section configured to stop the robot in the case where an external force on the robot has exceeded a predetermined limit value; a position recording section configured to record a stopping position of the robot or a stopping position and an orientation of the robot when the robot has been stopped by the stopping section; a position distribution generation section configured to generate a distribution of the stopping positions of the robot recorded by the position recording section; and a speed changing section configured to change an operating speed of the robot in accordance with the distribution of the stopping positions of the robot generated by the position distribution generation section.

The objects, features and advantages as described above, and another objects and advantages of the present invention of the present invention will become more apparent from the following description of the embodiments in connection with the accompanying drawings.

DETAILED DESCRIPTION

Figure 1:
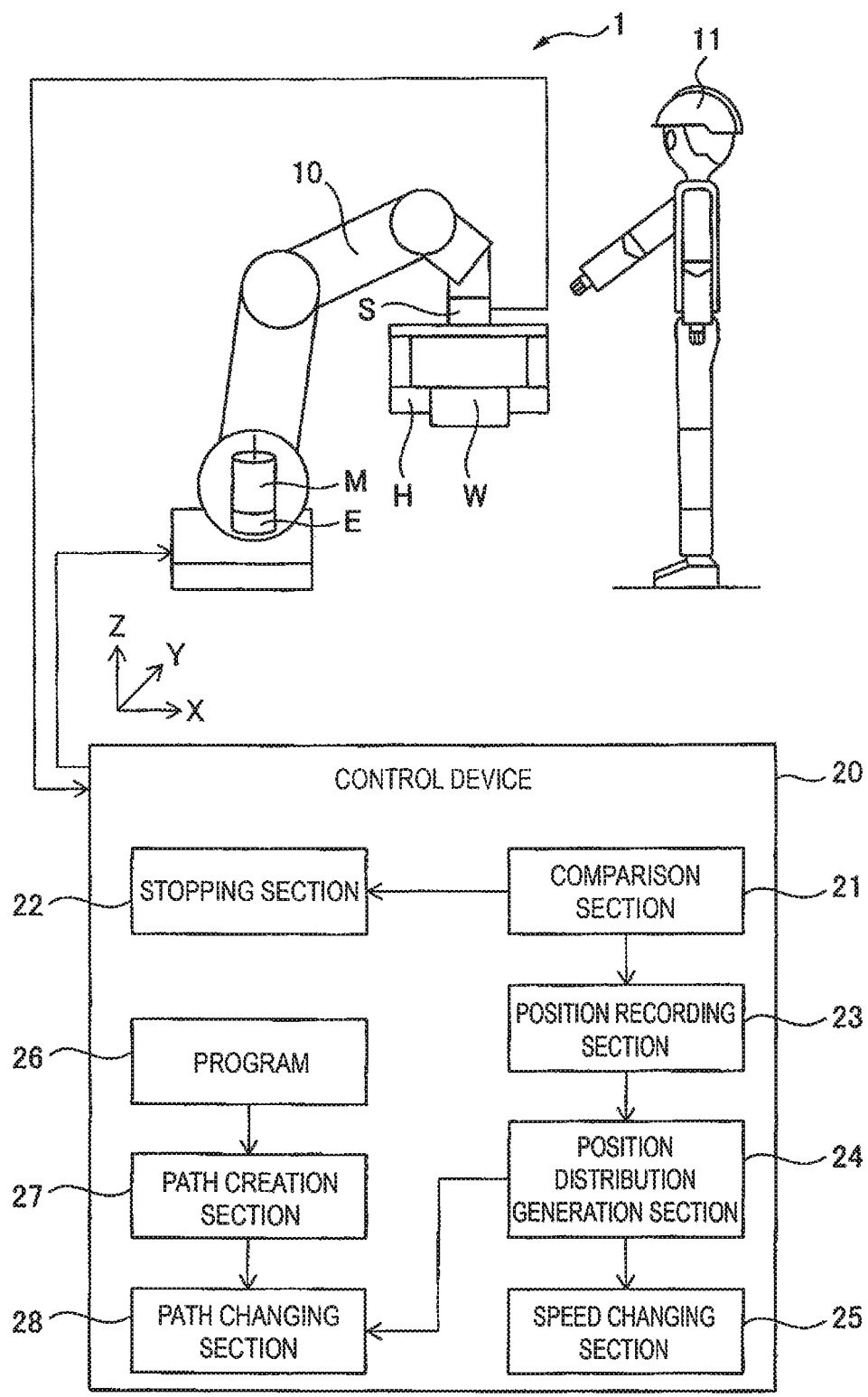
FIG. 1 is a diagram illustrating the basic configuration of a human-cooperative robot system according to the present invention.

Embodiments of the present invention will be described hereinafter with reference to the appended drawings. In the drawings, identical members are given identical reference signs. Scales in the drawings are changed as appropriate in order to facilitate understanding.

FIG. 1 is a diagram illustrating the basic configuration of a human-cooperative robot system according to an aspect of the present invention. As illustrated in FIG. 1, a human-cooperative robot system 1 mainly includes a robot 10, a control device 20 controlling the robot 10, and a human 11. The robot 10 is arranged near the human 11, and thus in the human-cooperative robot system 1, the robot 10 and the human 11 can work cooperatively while sharing a workspace.

The robot 10 is a six-axis articulated robot, for example, and a hand H capable of gripping a workpiece W is provided on a tip end thereof. An external force sensor S is installed in the robot 10 between the hand H and the tip end of a robot arm. The robot 10 may have a different configuration from that illustrated in FIG. 1, and the external force sensor S may be installed in a different part of the robot 10. The external force sensor S detects external force acting on the robot 10.

The control device 20 illustrated in FIG. 1 is a digital computer, and includes a predetermined operation program 26 for operating the robot 10. The operation program 26 is assumed to be recorded in memory, e.g. ROM. The control device 20 includes a comparison section 21 that compares an external force detected by the external force sensor S with a predetermined limit value, and a stopping section 22 that stops the robot 10 in the case where the external force has exceeded the predetermined limit value. The stopping section 22 may be a power interrupter that interrupts power supplied to the robot 10.

The control device 20 further includes a position recording section 23 that records a stopping position of the robot, or a stopping position and orientation of the robot 10, when the robot 10 has been stopped by the stopping section 22. The position recording section 23 is in memory, e.g. RAM.

The control device 20 further includes a position distribution generation section 24 that generates a distribution of the stopping positions of the robot 10 recorded by the position recording section 23. The control device 20 further includes a speed changing section 25 that automatically changes the operating speed of the robot 10 in accordance with the stopping position distribution of the robot 10 generated by the position distribution generation section 24. A CPU of the control device 20 is assumed to have the functions of the position distribution generation section 24 and the speed changing section 25. The same generally applies to the other constituent elements of the control device 20, described later.

Furthermore, as illustrated in FIG. 1, the control device 20 includes a path creation section 27 that creates an operation path of the robot 10 in accordance with details of the operation program 26. The control device 20 further includes a path changing section 28 that automatically changes the operation path of the robot 10 in accordance with the stopping position distribution of the robot 10 generated by the position distribution generation section 24.

The robot 10 moves along the operation path created by the path creation section 27. An output value from the external force sensor S is supplied to the comparison section 21 at a predetermined control period while the robot 10 is moving. The comparison section 21 compares the output value from the external force sensor S with a predetermined limit value each time the output value is supplied. In the case where the output value from the external force sensor S is greater than the predetermined limit value, the robot 10 is determined to have made contact with the human 11 or an outside obstacle. In such a case, the stopping section 22 causes the robot 10 to stop, and the stopping position and/or orientation of the robot 10 at that time is recorded into the position recording section 23. It is assumed that the stopping position of the robot 10 is ascertained from an encoder E attached to a motor M installed in the robot.

Figure 2:
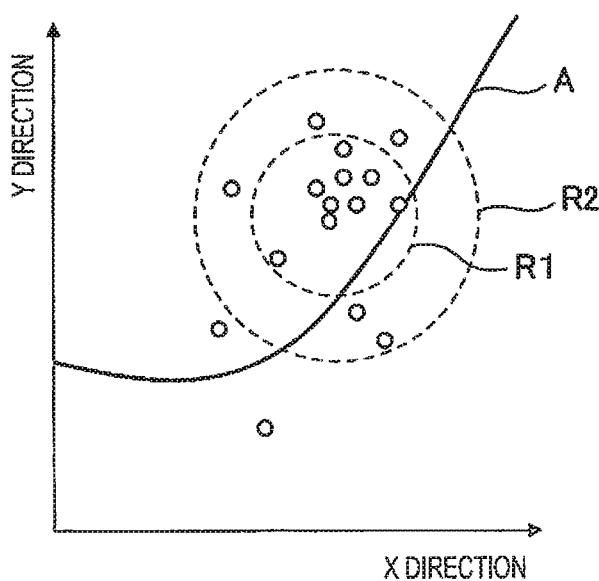
FIG. 2 is a diagram illustrating movement of a robot in an X direction and a Y direction.

After such processing is carried out at least once, the position distribution generation section 24 generates a distribution of a plurality of stopping positions of the robot 10. FIG. 2 is a diagram illustrating movement of the robot in an X direction and a Y direction. In FIG. 2, the horizontal axis represents the X direction, and the vertical axis represents the Y direction. While the following will describe the robot 10 as moving throughout an XY plane, the descriptions also generally apply to a YZ plane and an XZ plane.

Furthermore, the plurality of circles illustrated in FIG. 2 represent the stopping positions of the robot 10, and a distribution of such stopping positions is generated by the position distribution generation section 24. A solid line A in FIG. 2 represents the operation path of the robot 10 created by the path creation section 27.

The position distribution generation section 24 sets one or more limited speed regions on the basis of the stopping position distribution. Specifically, as illustrated in FIG. 2, the position distribution generation section 24 sets a region R1 in which the operating speed of the robot 10 is limited in an area where the stopping positions are concentrated. The position distribution generation section 24 then further sets a region R2, in which the operating speed of the robot 10 is more limited, in the periphery of the region R1.

In one embodiment, the operating speed of the robot 10 is 20% of a designated speed in the region R1, and the operating speed of the robot 10 is 50% of the designated speed in the region R2. Of course, the operating speeds in the regions R1 and R2 may be varied.

Figure 3:
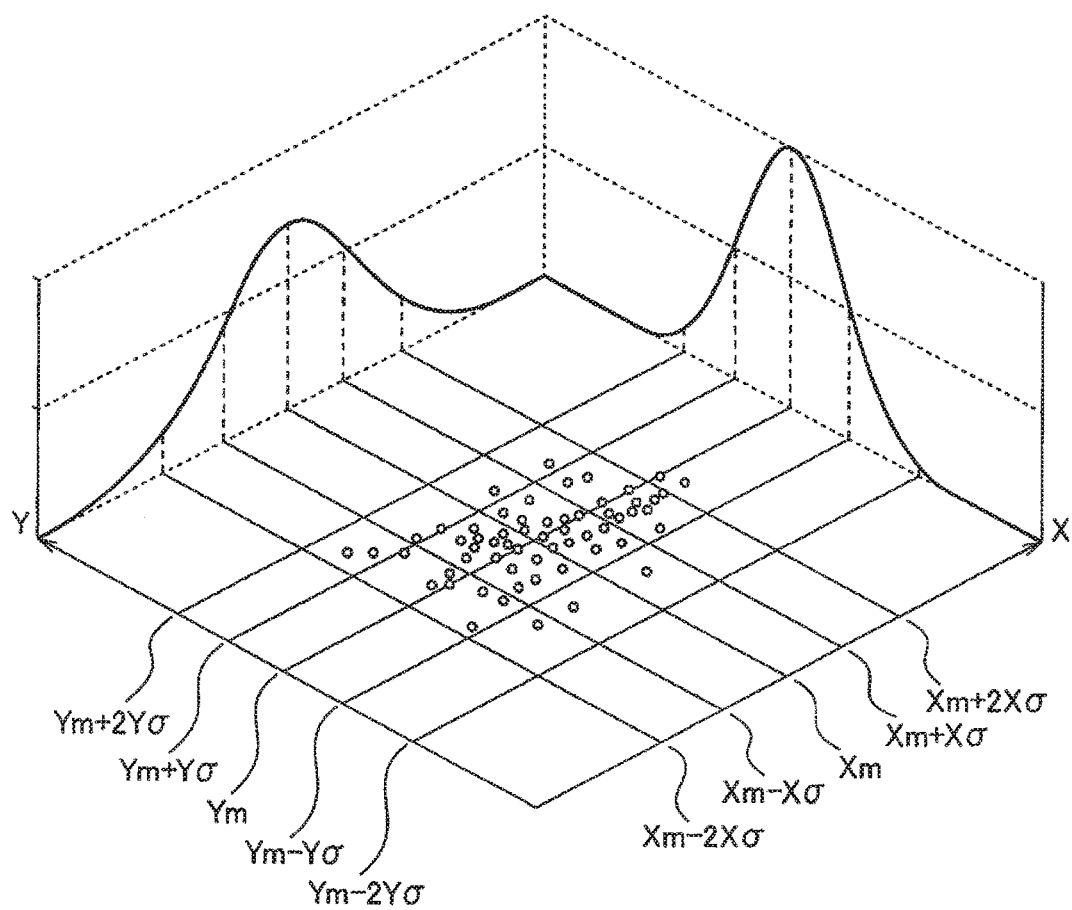
FIG. 3 is a diagram illustrating setting of a limited speed region and a change in a path.

FIG. 3 is a diagram illustrating setting of the limited speed regions and the like. In FIG. 3, the distribution of stopping positions of the robot 10 generated by the position distribution generation section 24 is illustrated relative to the X direction and the Y direction.

As illustrated in FIG. 3, the stopping positions of the robot 10 have a normal distribution with respect to the X direction and the Y direction. In FIG. 3, Xm and Ym are mean values of X coordinates and Y coordinates, respectively, for the plurality of stopping positions. $X\sigma$ and $Y\sigma$ represent standard deviations in the X direction and the Y direction, respectively.

In this regard, when the X coordinate of the robot 10 is from Xm−Xσ to Xm+Xσ, the speed changing section 25 sets the speed of the robot 10 in the X direction to 50% of the designated speed. Furthermore, when the X coordinate of the robot 10 is from Xm−2Xσ to Xm−Xσ and from Xm+XσX to Xm+2Xσ, the speed changing section 25 sets the speed of the robot 10 in the X direction to 20% of the designated speed.

Likewise, when the Y coordinate of the robot 10 is from Ym−Yσ to Ym+Yσ, the speed changing section 25 sets the speed of the robot 10 in the Y direction to 50% of the designated speed. Furthermore, when the Y coordinate of the robot 10 is from Ym−2Yσ to Ym−Yσ and from Ym+YσY to Ym+2Yσ, the speed changing section 25 sets the speed of the robot 10 in the Y direction to 20% of the designated speed.

The regions R1 and R2 illustrated in FIG. 2 are set on the basis of the mean values Xm and Ym and the standard deviations Xσ and Yσ for the stopping positions in this manner. Then, when the robot 10 is operated, the operating speed of the robot 10 is reduced in regions where many stops have been made. Accordingly, a situation in which the human 11 unintentionally makes contact with the robot 10 resulting in the robot 10 being stopped can be avoided. Furthermore, according to the aspect of the present invention, the robot 10 is not stopped, and thus a situation in which the work efficiency of the robot 10 decreases can be avoided.

Furthermore, the region R1 can be set as long as at least one stopping position is found. As the number of stopping positions increases, the regions R1 and R2 can be set, and the accuracy of those regions also increases. According to the present invention, almost no advance preparation is required to set such regions of reduced operating speed, which is beneficial for the operator.

In an embodiment not illustrated in the drawings, the setting of the region R2 may be omitted. Alternatively, three or more regions may be set. In such a case, the speed set for each region is assumed to decrease as the coordinates approach the mean values Xm and Ym. Furthermore, using a coefficient k greater than 0, regions from Xm−k·Xσ to Xm+k·Xσ and from Ym−k·Yσ to Ym+k·Yσ may be set as regions in which the speed is reduced.

Figure 4:
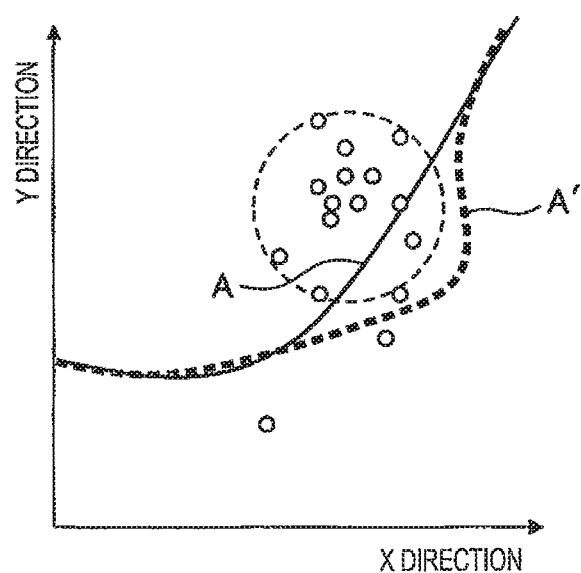
FIG. 4 is another diagram illustrating movement of a robot in the X direction and the Y direction.

FIG. 4 is another diagram illustrating movement of the robot in the X direction and the Y direction. In addition to the operation path A of the robot, FIG. 4 illustrates a new, changed operation path A'. The operation path A' is created by the path changing section 28 from the operation path A on the basis of the mean values Xm and Ym and the standard deviations Xσ and Yσ of the stopping positions.

Specifically, the path changing section 28 sets a region in FIG. 3 in which the X coordinates of the robot 10 are from Xm−Xσ to Xm+Xσ as a region through which the robot 10 cannot pass. Likewise, the path changing section 28 sets a region in FIG. 3 in which the Y coordinates of the robot 10 are from Ym−Yσ to Ym+Yσ as a region through which the robot 10 cannot pass.

Then, the path changing section 28 creates the new path A' (see FIG. 4) to avoid the regions through which the robot 10 cannot pass. The original path A in FIG. 4 curves in a "−Y direction". The new path A' is created to project in substantially the same direction from the curved part of the original path A.

When the robot 10 is operated, the robot 10 moves to avoid regions where there are many stops. Accordingly, a situation in which the human 11 unintentionally makes contact with the robot 10 resulting in the robot 10 being stopped can be avoided. Furthermore, according to the present invention, the robot 10 is neither stopped nor slowed down, and thus a decrease in work efficiency of the robot 10 can be avoided.

In the same manner as described above, the path A' can be set as long as at least one stopping position is found. As the number of stopping positions increases, the accuracy of the path A' also increases. According to the present invention, almost no advance preparation is required to set the path A', which is beneficial for the operator. Note that in the embodiment illustrated in FIG. 4, too, the regions from Xm−k·Xσ to Xm+k·Xσ and from Ym−k·Yσ to Ym+k·Yσ may be set as regions through which the robot 10 cannot pass.

Figure 5:
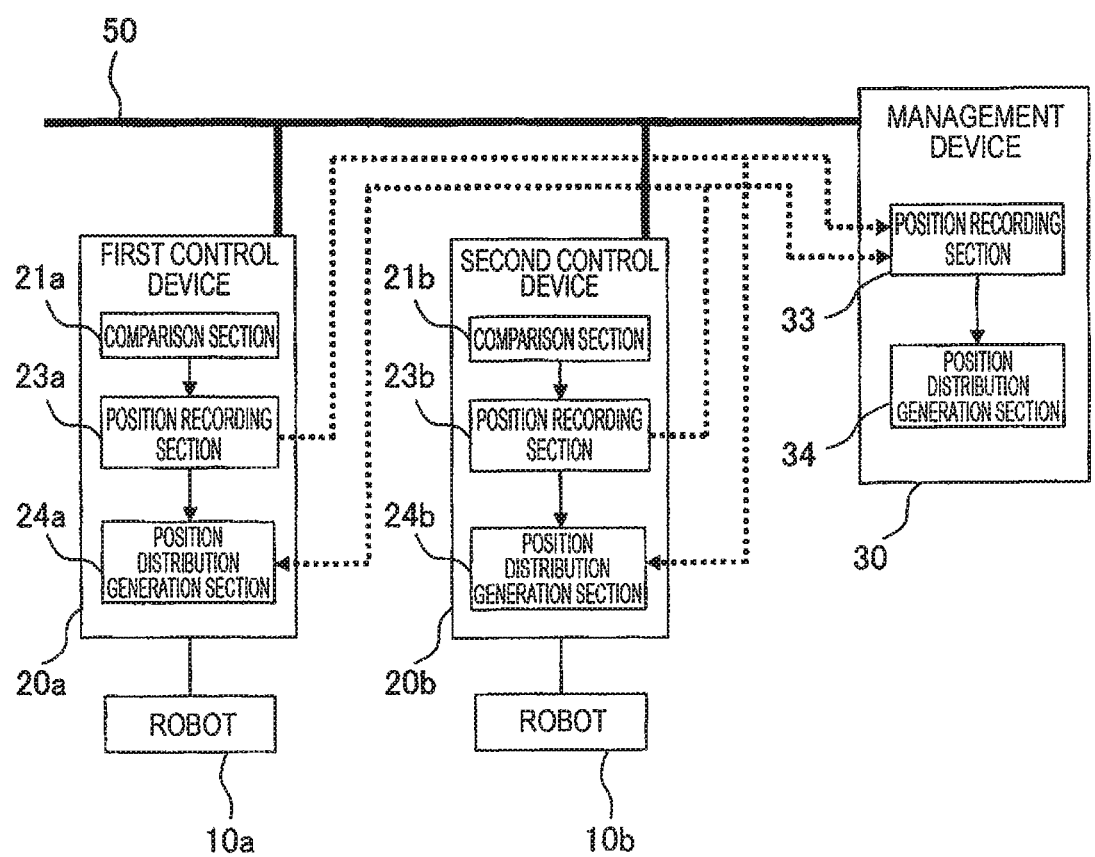
FIG. 5 is a diagram illustrating the configuration of a plurality of human-cooperative robot systems.

In this regard, FIG. 5 is a diagram illustrating the configuration of a plurality of human-cooperative robot systems. FIG. 5 illustrates two control devices 20a and 20b, as well as robots 10a and 10b connected to the control devices 20a and 20b, respectively. The control devices 20a and 20b illustrated in FIG. 5 include comparison sections 21a and 21b, position recording sections 23a and 23b, and position distribution generation sections 24a and 24b, respectively. Although not illustrated in the drawing, the two control devices 20a and 20b are assumed to also include the other elements illustrated in FIG. 1, e.g., the stopping section and the like.

As can be seen from FIG. 5, the two control devices 20a and 20b are connected to each other over a network 50. A management device 30 is furthermore connected to the network 50. The management device 30 is a device that manages all of a plurality of robots installed in a factory, for example. As illustrated in the drawing, the management device 30 includes a supra position recording section 33 and a supra position distribution generation section 34 similar to the position recording section and the position distribution generation sections described above. Note that many more control devices may be connected to the network 50.

As described above, in the case where the robots 10a and 10b have been stopped as a result of comparisons made by the comparison sections 21a and 21b of the control devices 20a and 20b, the stopping positions and the like of the robots 10a and 10b are recorded in the position recording sections 23a and 23b, respectively.

For example, the stopping positions and the like of the robot 10a recorded into the position recording section 23a of the control device 20a are supplied to the position recording section 23b of the other control device 20b and/or the supra position recording section 33 of the management device 30 through the network 50.

In the case where the configurations and the like of the robots 10a and 10b are the same, the position distribution generation section 24b of the other control device 20b generates a stopping position distribution on the basis of the supplied stopping positions of the robot 10a and the stopping positions of the robot 10b recorded in the position recording section 23b in advance. In this case, the number of stopping positions increases, and thus a detailed stopping position distribution can be generated. It is clear that as a result, the reduction in speed by the speed changing section 25 and the changing of the path by the path changing section 28 can be carried out in a finer grain.

Alternatively, the position distribution generation section 24b of the other control device 20b may generate the stopping position distribution of the robot 10a and the stopping position distribution of the robot 10b separately. This makes it possible to reduce the load on the control device 20a. This is particularly advantageous in the case where the robots 10a and 10b have different configurations and the like. Substantially identical processing can also be carried out in the case where the stopping positions of the robot 10b are supplied to the position recording section 23a of the control device 20a.

Likewise, the supra position recording section 33 of the management device 30 may generate the stopping position distribution on the basis of the supplied stopping positions of the robot 10a. Furthermore, the stopping positions of the robot 10a and the stopping positions of the robot 10b may be supplied to the supra position recording section 33 of the management device 30, and the supra position distribution generation section 34 may generate the stopping position distributions for each of the robots 10a and 10b. Of course, the supra position distribution generation section 34 may generate a stopping position distribution common for both the robots 10a and 10b.

These stopping position distributions are supplied to the control devices 20a and 20b, and are used as described above in the speed changing section 25 and/or the path changing section 28 of each control device. It is clear that in this case, the load on the position distribution generation sections 24a and 24b of the control devices 20a and 20b, respectively, is reduced.

Aspects of the Disclosure

According to a first aspect, provided is a robot system having a cooperative operating region where a worker and a robot can enter simultaneously. The system includes a control device, the control device controlling the robot. The control device includes: a stopping section configured to stop the robot in the case where an external force on the robot has exceeded a predetermined limit value; a position recording section configured to record a stopping position of the robot or a stopping position and an orientation of the robot when the robot has been stopped by the stopping section; a position distribution generation section configured to generate a distribution of the stopping positions of the robot recorded by the position recording section; and a speed changing section configured to change an operating speed of the robot in accordance with the distribution of the stopping positions of the robot generated by the position distribution generation section.

According to a second aspect, in the first aspect, the robot system includes a plurality of the robots, a plurality of the control devices, each of the control devices controlling the plurality of the robots, and a network connecting the plurality of the control devices to each other. The stopping positions recorded by the position recording section of a first control device of the plurality of the control devices are sent to a second control device of the plurality of the control devices over the network. The position distribution generation section of the second control device generates a distribution of at least one of the stopping positions of the first robot recorded in the position recording section of the first control devices and the stopping positions of the second robot of the plurality of the robots recorded in the position recording section of the second control device.

According to a third aspect, in the first aspect, the robot system includes a plurality of the robots and a plurality of the control devices, each of the control devices controlling the plurality of the robots, a network connecting the plurality of the control devices to each other, and a management device configured to manage a factory where the plurality of the robots are arranged. The positions recorded by the position recording sections of the plurality of the control devices are sent to the management device over the network. The management device includes: a supra position recording section configured to record a stopping position of each of the robots or a stopping position and an orientation of each of the robots when each of the robots has been stopped by the stopping section in the corresponding one of the plurality of the control devices; and a supra position distribution generation section configured to generate a distribution of the stopping positions of each of the plurality of the robots recorded by the supra position recording section.

According to a fourth aspect, provided is a robot system having a cooperative operating region where a worker and a robot can enter simultaneously. The system includes a control device, the control device controlling the robots. The control devices includes: a stopping section configured to stop the robot in the case where an external force on the robot has exceeded a predetermined limit value; a position recording section configured to record a stopping position of the robot or a stopping position and an orientation of the robot when the robot has been stopped by the stopping section; a position distribution generation section configured to generate a distribution of the stopping positions of the robot recorded by the position recording section; and a path changing section configured to change an operation path of the robot in accordance with the distribution of the stopping positions of the robot generated by the position distribution generation section.

According to a fifth aspect, in the fourth aspect, the robot system includes a plurality of the robots, a plurality of the control devices, each of the control devices controlling the plurality of the robots, and a network connecting the plurality of the control devices to each other. The stopping positions recorded by the position recording section of a first control device of the plurality of the control devices are sent to a second control device of the plurality of the control devices over the network. The position distribution generation section of the second control device generates a distribution of at least one of the stopping positions of the first robot recorded in the position recording section of the first control device and the stopping positions of the second robot of the plurality of the robots recorded in the position recording section of the second control device.

According to a sixth aspect, in the fourth aspect, the robot system includes a plurality of the robots and a plurality of the control devices, each of the control devices controlling the first robot of the plurality of the robots, a network connecting the plurality of the control devices to each other, and a management device configured to manage a factory where the plurality of the robots are arranged. The positions recorded by the position recording sections of the plurality of the control devices are sent to the management device over the network. The management device includes: a supra position recording section configured to record a stopping position of each of the robots or a stopping position and an orientation of each of the robots when each of the robots has been stopped by the stopping section in the corresponding one of the plurality of the control devices; and a supra position distribution generation section configured to generate a distribution of the stopping positions of each of the plurality of robots recorded by the supra position recording section.

Effects of Aspects

According to the first aspect, the operating speed of the robot decreases in a region where there are many stops, and thus a situation in which a human unintentionally makes contact with the robot resulting in the robot being stopped can be avoided. It is not necessary to stop the robot, and thus a situation in which the work efficiency of the robot decreases can be avoided. Additionally, advance preparations for reducing the operating speed are not necessary.

According to the second aspect, the load on the position distribution generation section of one of the control devices can be reduced.

According to the third aspect, the load on the position distribution generation sections of the control devices can be reduced.

According to the fourth aspect, the operating speed of the robot decreases in a region where there are many stops, and thus a situation in which a human unintentionally makes contact with the robot resulting in the robot being stopped can be avoided. It is not necessary to stop the robot, and thus a situation in which the work efficiency of the robot decreases can be avoided. Additionally, advance preparations for changing the operation path are not necessary.

According to the fifth aspect, the load on the position distribution generation section of one of the control devices can be reduced.

According to the sixth aspect, the load on the position distribution generation sections of the control devices can be reduced.

Although these aspects have been described using a representative embodiment, it will be clear to one skilled in the art that the above-described variations, as well as other modifications, omissions, and additions, can be made without departing from the scope of these aspects.

The invention claimed is:

1. A robot system having a cooperative operating region where a worker and a robot can enter simultaneously, the system comprising:
   a control device, the control device controlling the robot, the control device including:
      a stopping section configured to stop the robot in the case where an external force on the robot has exceeded a predetermined limit value;
      a position recording section configured to record a stopping position of the robot or a stopping position and an orientation of the robot when the robot has been stopped by the stopping section;
      a position distribution generation section configured to generate a distribution of the stopping positions of the robot recorded by the position recording section; and
      a speed changing section configured to change an operating speed of the robot in accordance with the distribution of the stopping positions of the robot generated by the position distribution generation section.

2. The robot system of claim 1,
   wherein the robot system comprises:

a plurality of the robots;
a plurality of the control devices, each of the control devices controlling the plurality of the robots; and
a network connecting the plurality of the control devices to each other,
the stopping positions recorded by the position recording section of a first control device of the plurality of the control devices are sent to a second control device of the plurality of the control devices over the network; and
the position distribution generation section of the second control device generates a distribution of at least one of the stopping positions of the first robot recorded in the position recording section of the first control device and the stopping positions of the second robot of the plurality of the robots recorded in the position recording section of the second control devices.

3. The robot system of claim 1,
wherein the robot system comprises:
a plurality of the robots and a plurality of the control devices, each of the control devices controlling the plurality of the robots;
a network connecting the plurality of the control devices to each other; and
a management device configured to manage a factory where the plurality of the robots are arranged,
the positions recorded by the position recording sections of the plurality of the control devices are sent to the management device over the network; and
the management device includes:
a supra position recording section configured to record a stopping position of each of the robots or a stopping position and an orientation of each of the robots when each of the robots has been stopped by the stopping section in the corresponding one of the plurality of the control devices; and
a supra position distribution generation section configured to generate a distribution of the stopping positions of each of the plurality of the robots recorded by the supra position recording section.

4. A robot system having a cooperative operating region where a worker and a robot can enter simultaneously, the system comprising:
a control device, the control devices controlling the robot, the control device including:
a stopping section configured to stop the robot in the case where an external force on the robot has exceeded a predetermined limit value;
a position recording section configured to record a stopping position of the robot or a stopping position and an orientation of the robot when the robot has been stopped by the stopping section;
a position distribution generation section configured to generate a distribution of the stopping positions of the robot recorded by the position recording section; and
a path changing section configured to change an operation path of the robot in accordance with the distribution of the stopping positions of the robot generated by the position distribution generation section.

5. The robot system of claim 4, wherein
the robot system comprises:
a plurality of the robots;
a plurality of the control devices each of the control devices controlling the plurality of the robots; and
a network connecting the plurality of the control devices to each other,
the stopping positions recorded by the position recording section of a first control device of the plurality of the control devices are sent to a second control device of the plurality of the control devices over the network; and
the position distribution generation section of the second control device generates a distribution of at least one of the stopping positions of the first robot recorded in the position recording section of the first control device and the stopping positions of the second robot of the plurality of the robots recorded in the position recording section of the second control devices.

6. The robot system of claim 4, wherein
the robot system comprises:
a plurality of the robots and a plurality of the control devices, each of the control devices controlling the plurality of the robots;
a network connecting the plurality of the control devices to each other; and
a management device configured to manage a factory where the plurality of the robots are arranged,
the positions recorded by the position recording sections of the plurality of the control devices are sent to the management device over the network; and
the management device includes:
a supra position recording section configured to record a stopping position of each of the robots or a stopping position and an orientation of each of the robots when each of the robots has been stopped by the stopping section in the corresponding one of the plurality of the control devices; and
a supra position distribution generation section configured to generate a distribution of the stopping positions of each of the plurality of the robots recorded by the supra position recording section.

* * * * *